United States Patent
Youtz et al.

(10) Patent No.: US 10,951,388 B2
(45) Date of Patent: Mar. 16, 2021

(54) MANAGING USER EQUIPMENT TIME DIVISION DUPLEX UPLINK DUTY CYCLES

(71) Applicant: Verizon Patent and Licensing Inc., Arlington, VA (US)

(72) Inventors: Andrew E. Youtz, Princeton, NJ (US); Xin Wang, Morris Plains, NJ (US); Lily Zhu, Parsippany, NJ (US); Hui Zhao, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 16/405,098

(22) Filed: May 7, 2019

(65) Prior Publication Data
US 2020/0358589 A1    Nov. 12, 2020

(51) Int. Cl.
| H04L 5/14 | (2006.01) |
|---|---|
| H04W 72/14 | (2009.01) |
| H04W 8/24 | (2009.01) |
| H04W 60/00 | (2009.01) |
| H04W 76/27 | (2018.01) |
| H04W 72/04 | (2009.01) |

(52) U.S. Cl.
CPC ........... *H04L 5/1469* (2013.01); *H04W 8/245* (2013.01); *H04W 60/00* (2013.01); *H04W 72/0446* (2013.01); *H04W 72/14* (2013.01); *H04W 76/27* (2018.02)

(58) Field of Classification Search
CPC .... H04L 5/1469; H04W 76/27; H04W 8/245; H04W 72/14; H04W 60/00; H04W 72/0446
See application file for complete search history.

(56) References Cited

U.S. PATENT DOCUMENTS

| 10,750,532 | B2* | 8/2020 | Babaei | H04W 72/14 |
|---|---|---|---|---|
| 2012/0002578 | A1* | 1/2012 | Ji | H04L 1/16 |
| | | | | 370/281 |
| 2012/0082038 | A1* | 4/2012 | Xu | H04L 5/0044 |
| | | | | 370/244 |
| 2012/0082070 | A1* | 4/2012 | Hart | H04L 1/0001 |
| | | | | 370/280 |
| 2014/0044024 | A1* | 2/2014 | Zou | H04W 76/14 |
| | | | | 370/280 |
| 2014/0328353 | A1* | 11/2014 | Li | H03M 1/007 |
| | | | | 370/474 |
| 2016/0066276 | A1* | 3/2016 | Su | H04J 3/1694 |
| | | | | 370/252 |
| 2016/0198461 | A1* | 7/2016 | Su | H04W 72/0446 |
| | | | | 370/329 |

(Continued)

FOREIGN PATENT DOCUMENTS

| WO | WO-2004015911 A1 * | 2/2004 | H04L 1/1854 |
|---|---|---|---|
| WO | WO-2013112983 A2 * | 8/2013 | H04J 3/1694 |

*Primary Examiner* — Jay P Patel

(57) ABSTRACT

A device may receive a signal from a wireless station; and determine a network-permitted Time Division Duplex (TDD) uplink duty cycle based on the signal. If the determined network-permitted TDD uplink duty cycle is greater than a maximum allowable TDD uplink duty cycle for the device, when the device performs TDD uplink transmission after receiving a scheduling grant from the wireless station, the device may decrease the TDD uplink duty cycle of the device or may decrease a time-average transmission power of the device.

20 Claims, 13 Drawing Sheets

(56) References Cited

U.S. PATENT DOCUMENTS

| | | | |
|---|---|---|---|
| 2017/0048047 A1* | 2/2017 | Kadous | H04L 1/1854 |
| 2017/0048889 A1* | 2/2017 | Kadous | H04W 72/14 |
| 2017/0332288 A1* | 11/2017 | Sadek | H04L 5/001 |
| 2017/0332333 A1* | 11/2017 | Santhanam | H04W 52/367 |
| 2017/0367116 A1* | 12/2017 | Li | H04W 52/325 |
| 2018/0167897 A1* | 6/2018 | Sampath | H04W 52/365 |
| 2018/0367382 A1* | 12/2018 | Zhang | H04W 72/044 |
| 2020/0021421 A1* | 1/2020 | Han | H04W 74/002 |
| 2020/0162053 A1* | 5/2020 | Goto | H03H 9/02834 |
| 2020/0260485 A1* | 8/2020 | Lei | H04L 1/1819 |

* cited by examiner

FIG. 3C

| μ | SC SPACING | SUB-FRAMES/ FRAME | SLOTS/SUB-FRAME | SYMBOLS/ SLOT |
|---|---|---|---|---|
| 0 | 15 | 10 | 1 | 14 |
| 1 | 30 | 10 | 2 | 14 |
| 2 | 60 | 10 | 4 | 14 |
| 3 | 120 | 10 | 8 | 14 |
| 4 | 240 | 10 | 16 | 14 |

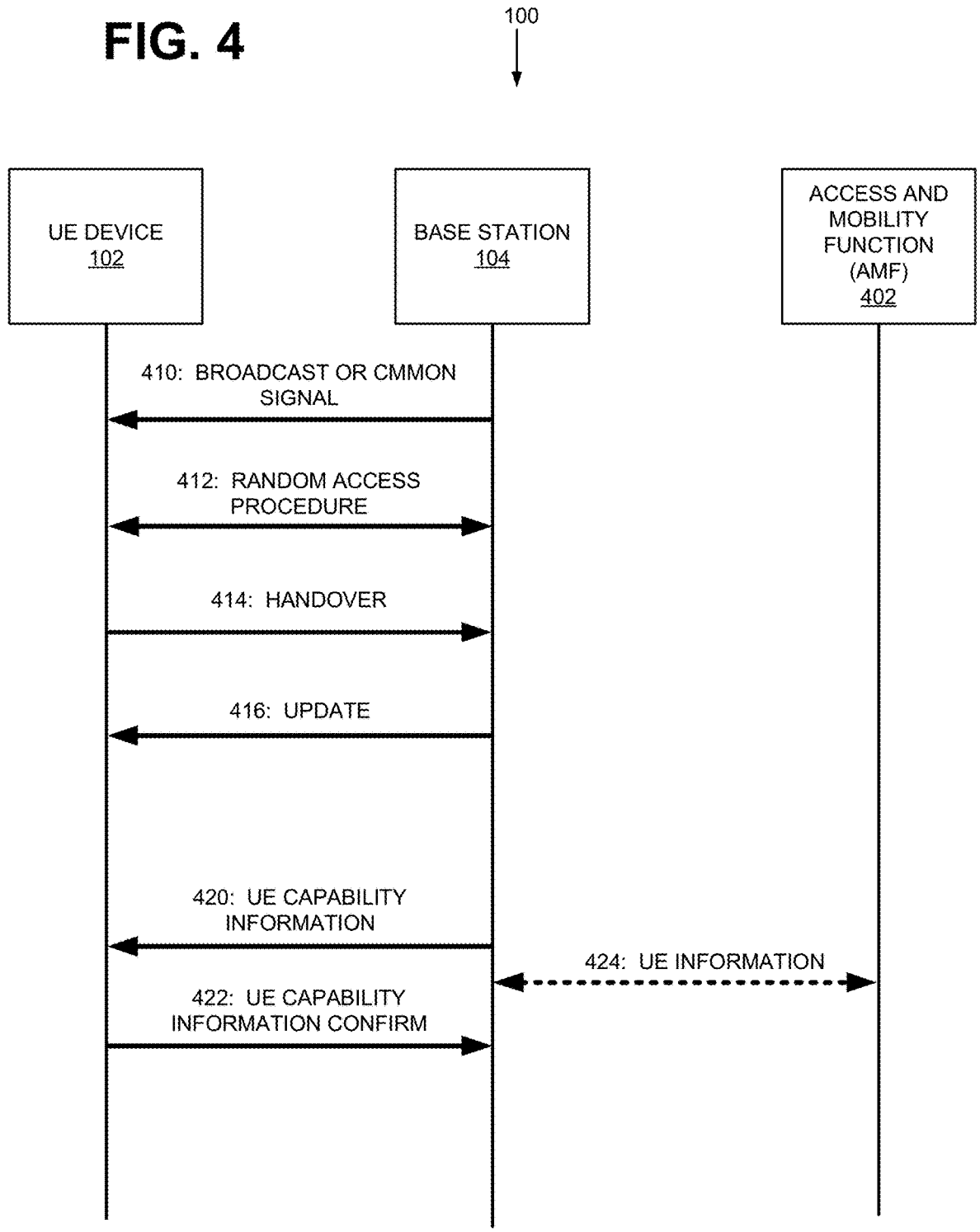

602

| INDEX | SYMBOLS IN A SLOT | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |

| 45 | D | D | D | D | D | D | F | F | U | U | U | U | U | U |

| 255 | | | | | | | | | | | | | | |

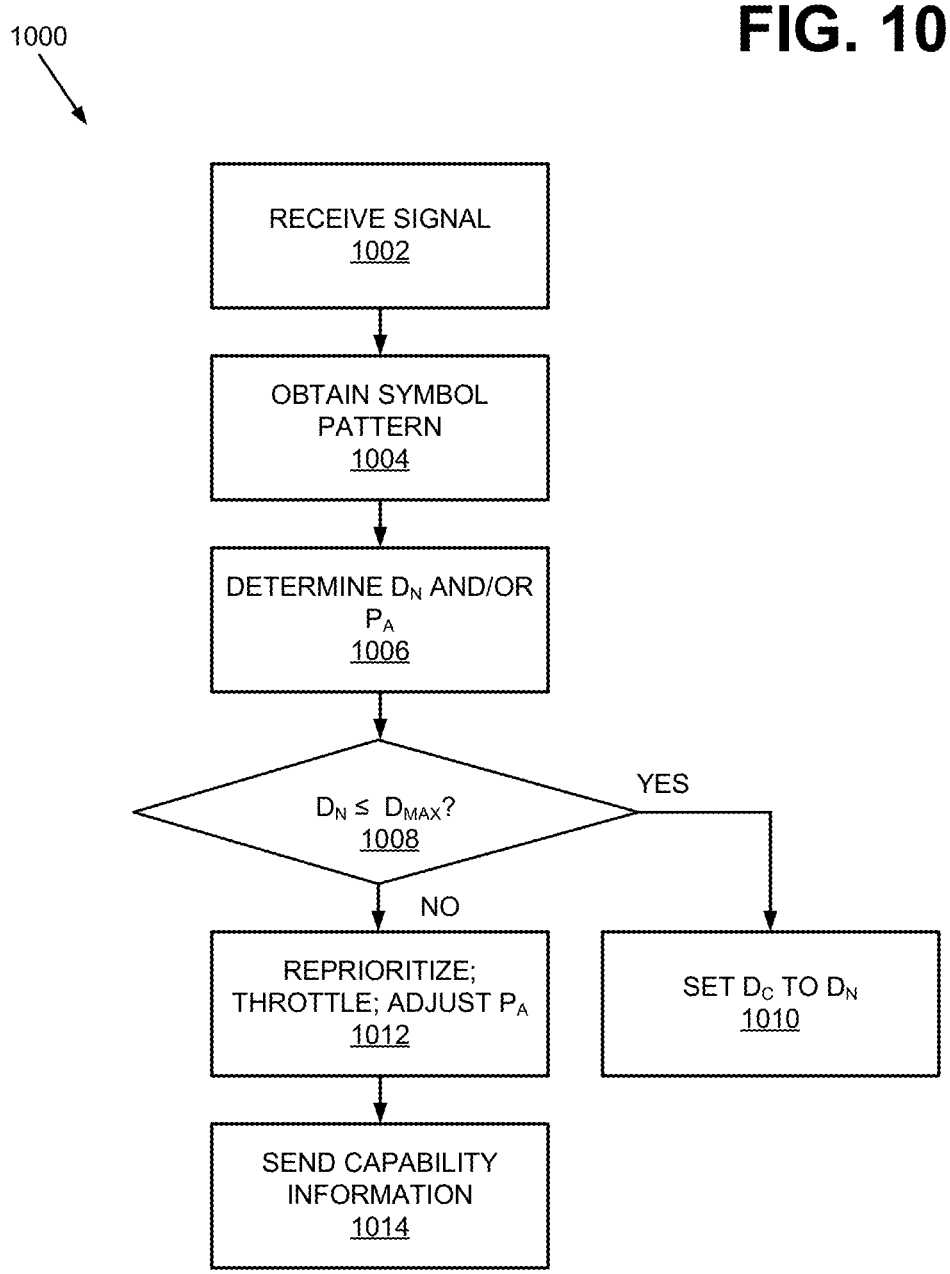

US 10,951,388 B2

MANAGING USER EQUIPMENT TIME DIVISION DUPLEX UPLINK DUTY CYCLES

BACKGROUND INFORMATION

In order to satisfy the needs and demands of users of mobile communication devices, providers of wireless communication services continue to improve available services. One aspect of these improvements relates to optimizing user equipment (UE) transmission speeds. In advanced networks, a base station has the capability to indicate, to UE devices, relative times at which the UE devices can transmit and receive data and control signals.

BRIEF DESCRIPTION OF THE DRAWINGS

FIG. 3C shows Fifth Generation (5G) numerology for subcarrier spacing;

FIG. 4 shows exemplary signals between the User Equipment (UE) device of FIG. 1, the base station of FIG. 1, and an exemplary Access and Mobility Function (AMF);

FIG. 10 is a flow diagram of an exemplary UE duty-cycle management process associated with the modem of FIG. 2.

DETAILED DESCRIPTION OF PREFERRED EMBODIMENTS

Figure 1:
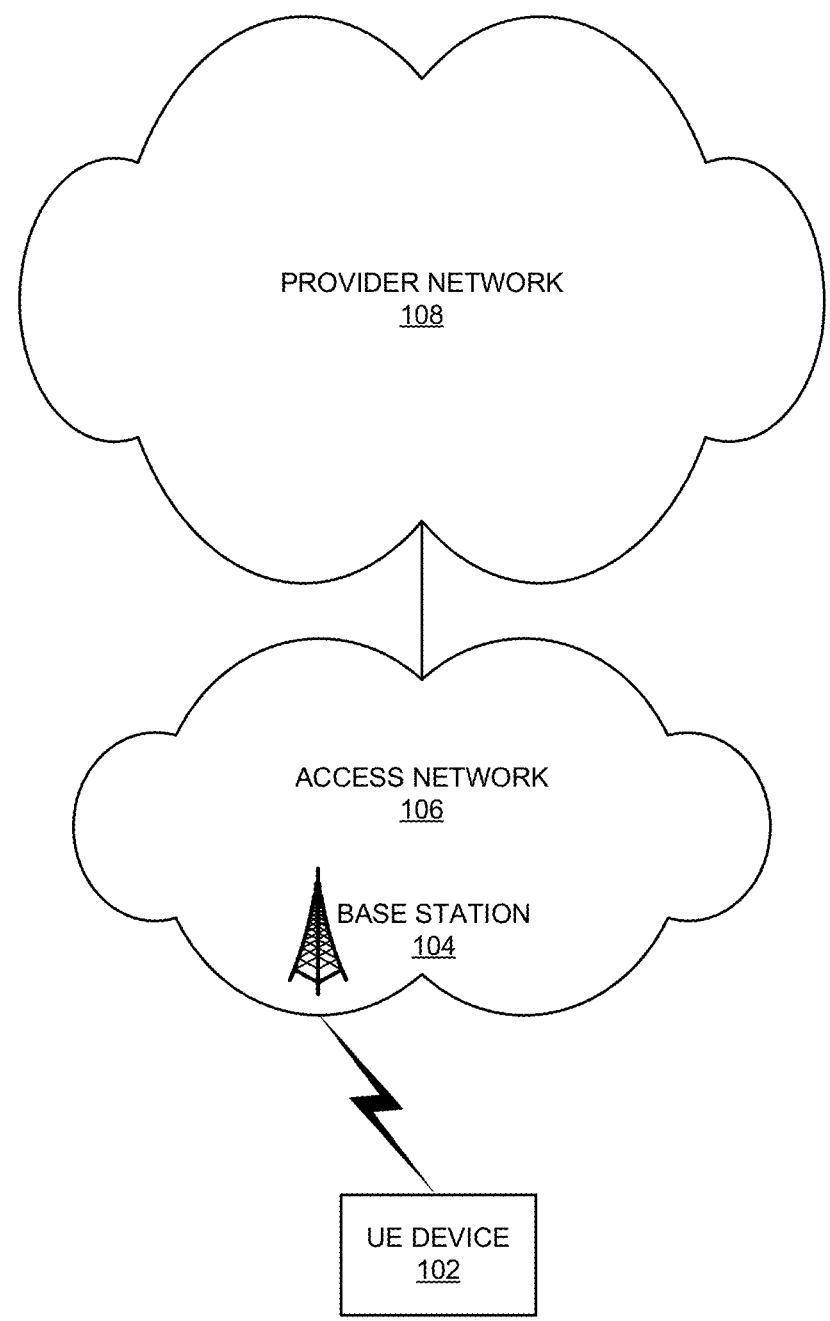
FIG. 1 illustrates an exemplary network environment in which the concepts described herein may be implemented.

The following detailed description refers to the accompanying drawings. The same reference numbers in different drawings may identify the same or similar elements.

When a device (e.g., a User Equipment (UE) device) is certified for operation in selected frequency bands (e.g., a Fifth Generation (5G) New Radio (NR) Time Division Duplex (TDD) frequency band), the vendor of the device needs to test the device at a maximum uplink duty cycle permitted or requested, within the bands, by the network. The testing ensures that, for example: (1) the device meets regulatory emission limits and Radio Frequency (RF) exposure limits at the device's maximum time average transmission power; and (2) the device meets functional and RF performance requirements under the maximum power and thermal loading.

The device may be unable to pass the test and thus be certified when the maximum uplink duty cycle at which the device can operate ($D_{MAX}$) is lower than the maximum uplink duty cycle permitted by the network ($D_N$). Should the device attempt to operate at the maximum uplink duty cycle permitted by the network, the device may operate beyond its power ratings ($P_{MAX}$) and beyond its thermal limit, resulting in overheating and/or component failure. In addition, the transmission power of the device operating at the network-permitted uplink duty cycle $D_N$ may not be compliant with regulatory limits on emissions and RF exposure.

Even though devices have passed the above-referenced test and have been certified, however, in a number of situations, such devices may operate at TDD duty cycles beyond the level set by regulations or the level set for its maximum power or thermal output. For example, assume that a UE device is certified at the maximum uplink network-permitted duty cycle ($D_N$) of 25% based on settings at a service provider network. Also, assume that, after the certification, the service provider network decides to allow its base station to set the network-permitted duty cycle $D_N$ to 50% to accommodate the uplink needs of fixed wireless access devices. However, because the base station is unable to distinguish the fixed wireless access devices from other types of wireless devices, the base station may inadvertently signal to the UE device that it is permitted to transmit at the updated duty cycle $D_N$.

In another example, again assume that the UE device is certified at the maximum uplink network-permitted duty cycle $D_N$ of 25% based on settings at the service provider network. If the UE device roams onto a foreign wireless network that is configured for a higher uplink (UL) duty cycle, the foreign network may set the network-permitted cycle $D_N$ at a higher value than the one for which the UE device has been certified.

In a 5G network architecture, as defined by 3GPP, or in another advanced network architecture, a base station may specify to UE devices specific transmission patterns for a TDD link. The designated transmission patterns may dictate the network-permitted uplink duty cycle $D_N$ for the UE devices, and thus drive the UE devices to transmit at an undesirable duty cycles.

In this specification, a UE device may be configured to manage its TDD uplink duty cycle in multiple ways to address the above-described problems associated with $D_N$. First, when a network conveys information that relates to a network-permitted uplink duty cycle $D_N$, the UE device may limit its transmission based on the following parameters: the UE device's internal maximum allowable uplink duty cycle ($D_{MAX}$); and/or its maximum allowable time-average transmission power ($P_{MAX}$). These parameters may have been set based on power ratings of the UE device and/or regulations on emissions and RF exposure for particular bands. By limiting TDD uplink duty cycle, the UE device may avoid transmitting more power than that permitted by its power ratings or may avoid violating emission and RF exposure regulations.

Second, the UE device may attempt to manage its TDD uplink duty cycle also by causing the network to issue a new network-permitted uplink duty cycle to the UE device. For example, the UE device may send, to the network, its capability information from which the network can infer the internal maximum allowable uplink duty cycle ($D_{MAX}$) of the UE device, and its maximum allowable time-average transmission power ($P_{MAX}$). Depending on the implementation, the network may issue a new duty cycle $D_N$ consistent with $D_{MAX}$ and the UE device's maximum transmission power $P_{MAX}$.

FIG. 1 illustrates an exemplary network environment 100 in which the above-described concepts may be implemented. As shown, network environment 100 may include a User Equipment (UE) device 102, an access network 106, and a provider network 108. Depending on the implementation, network environment 100 may include additional networks and components than those illustrated in FIG. 1. For simplicity, FIG. 1 does not show all components that may be included in network environment 100 (e.g., routers, bridges, wireless access point, additional UE devices, etc.).

UE device 102 may include a handheld wireless computational, communication device. Examples of a UE device 102 include: a smart phone; a tablet device; a wearable computer device (e.g., a smart watch); a global positioning system (GPS) device; a laptop computer; a media playing device; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices.

Access network 106 may allow UE device 102 to access provider network 108. To do so, access network 106 may establish and maintain, with participation from UE device 102, an over-the-air channel with UE device 102; and maintain backhaul channels with provider network 108. Access network 106 may convey information through these channels, from UE device 102 to provider network 108 and vice versa.

Access network 106 may include a Long-term Evolution (LTE) radio network and/or a 5G radio network or other advanced radio network. These networks may include many wireless stations, one of which is illustrated in FIG. 1 as base station 104 for establishing and maintaining an over-the-air channel with UE device 102.

Base station 104 may include a Fourth Generation (4G), 5G, or another type of base station (e.g., eNB, gNB, etc.) that includes one or more radio frequency (RF) transceivers. Base station 104 (also referred to as wireless station 104) may provide or support one or more of the following: a Time Division Duplex (TDD) slot format indicators (described below), a carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; and other types of LTE-Advanced (LTE-A) and/or 5G-related functions. In some implementations, base station 104 may be part of an evolved UMTS Terrestrial Network (eUTRAN).

Provider network 108 may include a local area network (LAN), a wide area network (WAN), a metropolitan area network (MAN), an optical network, a cable television network, a satellite network, a wireless network (e.g., a CDMA network, a general packet radio service (GPRS) network, an LTE core network (e.g., a 4G network), a 5G core network, an ad hoc network, a telephone network (e.g., the Public Switched Telephone Network (PSTN), an intranet, or a combination of networks. Provider network 108 may allow the delivery of Internet Protocol (IP) services to UE device 102, and may interface with other external networks, such as a packet data network. Provider network 108 may include or be connected to one or more packet data networks.

In FIG. 1, base station 104 may convey, to UE device 102, a symbol pattern that UE device 102 can use to set its TDD uplink duty cycle. Base station 104 may convey such a pattern in at least three different ways. First, base station 104 may transmit a broadcast or common signal to a group of UE devices in a cell. The signal may designate a specific TDD uplink symbol pattern for the UE devices. Second, in response to a scheduling request from UE device 102, base station 104 may send a scheduling grant to UE device 102. The scheduling grant may indicate the times at which TDD uplink symbols can be transmitted by UE device 102 and thus sets the TDD uplink symbol pattern. Third, after UE device 102 establishes a Radio Resource Control (RRC) connection with base station 104, base station 104 may send, over the dedicated channel, RRC parameters that set the TDD uplink symbol pattern.

In each of the above cases, in response to receiving the specified TDD uplink symbol pattern from base station 104, UE device 102 may attempt to manage its TDD uplink duty cycle. For example, UE device 102 may control its transmission based on the designated TDD uplink symbol patterns and one or more parameters: its own internal maximum uplink duty cycle ($D_{MAX}$) and/or a maximum time-average transmission power $P_{MAX}$. $D_{MAX}$ and $P_{MAX}$ may have been set based on UE device power ratings and/or emission and RF exposure regulations. In another example, UE device 102 may attempt to manage its TDD uplink duty cycle by sending UE capability information to base station 104. Depending on the implementation, the information may cause base station 104 to issue a new symbol pattern UE device 102, setting a new uplink duty cycle $D_N$ for UE device 102.

Figure 2:
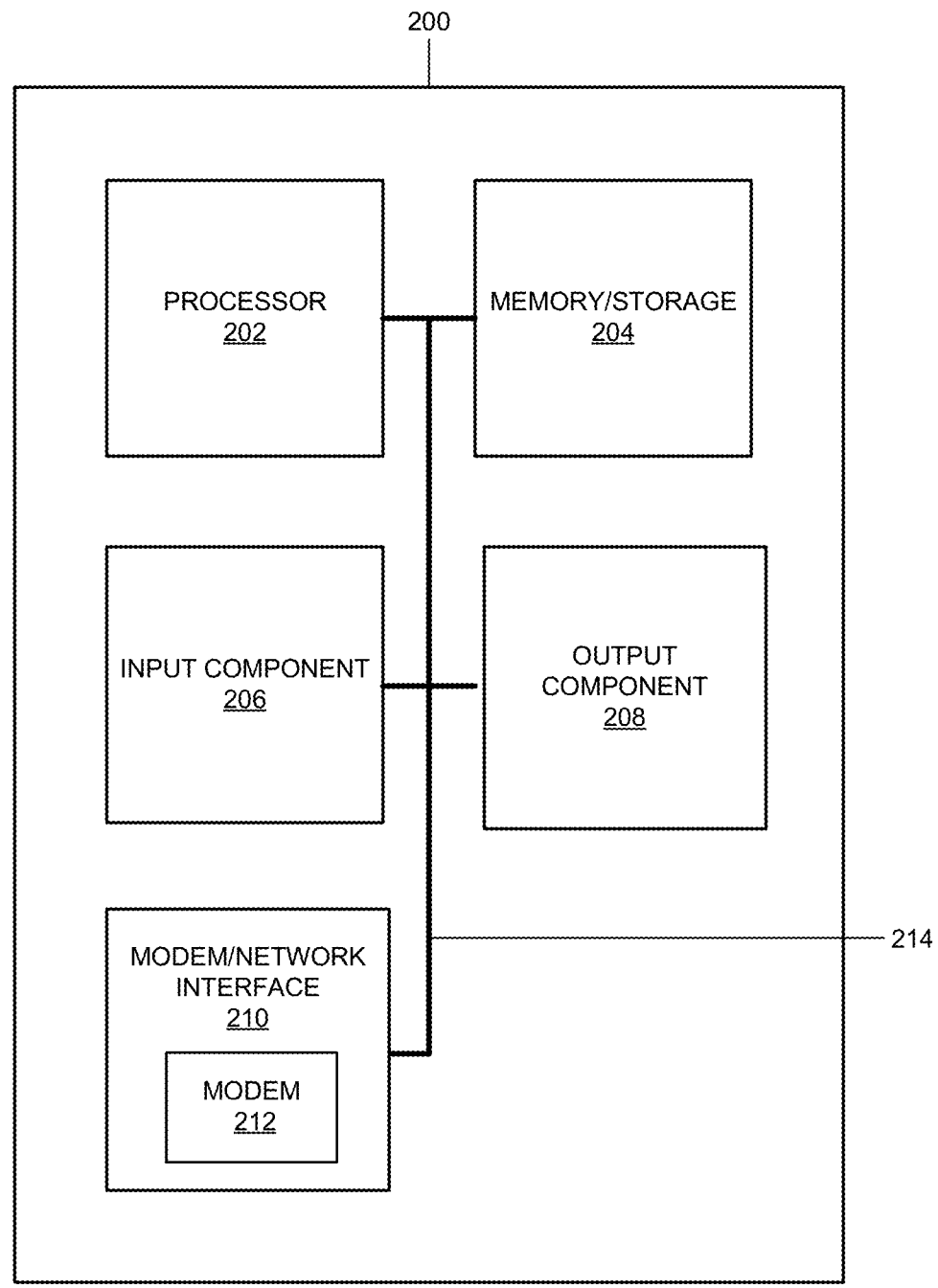
FIG. 2 depicts exemplary components of an exemplary network device of FIG. 1.

FIG. 2 depicts exemplary components of an exemplary network device 200. Network device 200 may correspond to or may be included in any of network components of FIG. 1 (e.g., UE device 102; base station 104; access network 106; provider network 108; other network components such as routers, switches, gateways, servers, etc.).

As shown, network device 200 may include a processor 202, memory/storage 204, input component 206, output component 208, network interface 210 with modem 212, and communication path 214. In different implementations, network device 200 may include additional, fewer, different, or different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input/output components 206 and 208 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate over a network, such as the Internet, an intranet, a terrestrial wireless network (e.g., a WLAN, WiFi, WiMax, etc.), a satellite-based network, optical network, etc.

Network interface 210 may include an Ethernet interface to a LAN, and/or an interface/connection for connecting device 200 to other devices (e.g., a Bluetooth interface). For example, network interface 210 may include modem 212 for modulation and demodulation. In some implementations, modem 212 may include logic to manage TDD uplink duty cycle, as described below with reference to FIGS. 4, 5, 6A, 6B, 7A, 7B, 8A-8D, 9A, 9B and 10. Communication path 214 may provide an interface through which components of device 200 can communicate with one another.

Network device 200 may perform the operations described herein in response to processor 202 and/or modem 212 executing software instructions stored in a non-transient computer-readable medium, such as memory/storage 204 or another memory/storage device within modem 212. The software instructions may be read into memory/storage from another computer-readable medium or from another device via network interface 210. The software instructions stored in memory/storage (e.g., memory/storage 204 or another memory/storage within modem 212), when executed by processor 202, may cause processor 202 and/or modem 212 to perform processes that are described herein.

Figure 3A:
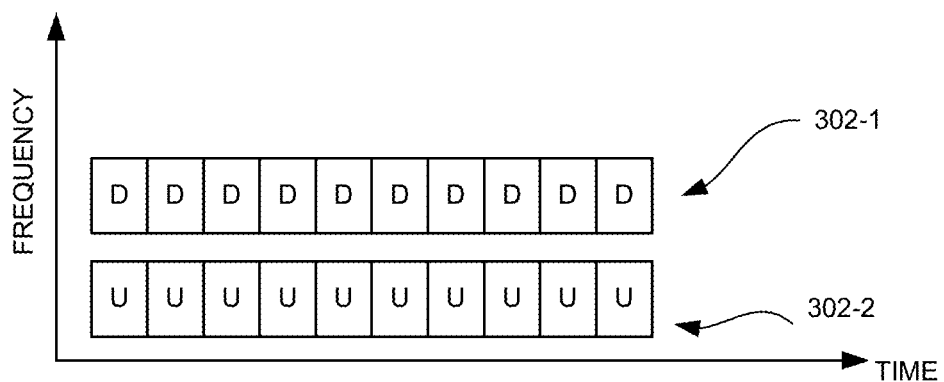
FIGS. 3A and 3B illustrate exemplary Frequency Division Duplex (FDD) and Time Division Duplex (TDD) communication links, respectively.
Figure 3B:
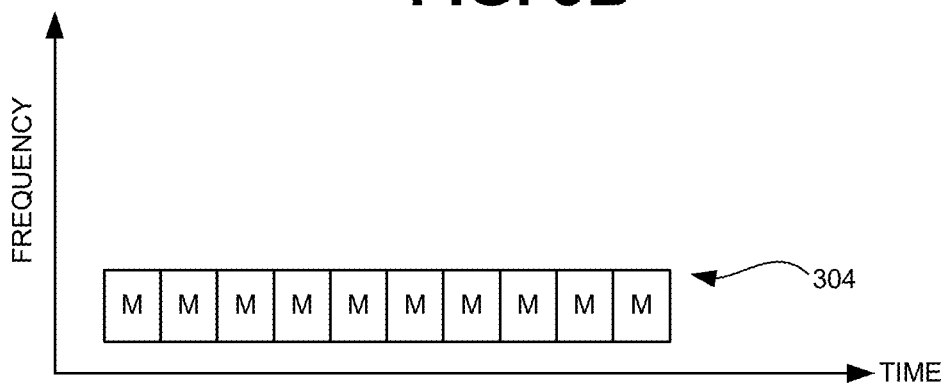

FIGS. 3A and 3B illustrate exemplary Frequency Division Duplex (FDD) and Time Division Duplex (TDD) communication links between UE device 102 and base station 104.

As shown in FIG. 3A, an FDD link between UE device 102 and base station 104 may include downlink signal 302-1, which is transmitted from base station 104 to UE device 102 and uplink signal 302-2, which is transmitted from UE device 102 to base station 104. As also illustrated, downlink signal 302-1 and uplink signal 302-2 occupy different frequency bands. Each of signals 302-1 and 302-2 is organized into blocks, or "frames." Each frame is marked "D" or "U" to indicate whether the frame is part of an uplink or downlink signal.

FIG. 3B illustrates an exemplary Time Division Duplex (TDD) channel. As shown, TDD channel 304 includes both uplink and downlink signals. In contrast to the FDD uplink and downlink frames of FIG. 3A, which occupy two different frequency bands, the uplink and downlink signals in TDD channel 304 are interleaved and are at a single frequency band. That is, each of UE device 102 and base station 104 takes turns transmitting to the other at specific times. Each frame is marked "M" to indicate a mix of uplink and downlink transmissions from UE device 102 and base station 104.

For many radio networks, an uplink or downlink signal spans a particular frequency band with multiple subcarriers. Typically, a spacing between the subcarriers depends on the particular band the signal occupies. In some network architectures, as in the 5G network architecture, each subcarrier spacing is associated with a specific number. That is, the 5G standard has a numerology for its subcarriers and their associated parameters.

FIG. 3C shows the 5G numerology for subcarrier spacing. As shown, numbers $\mu$=0, 1, 2, 3, and 4 designate subcarrier (SC) spacing of 15 kHz, 30 kHz, 60 kHz, 120 kHz, and 240 kHz, respectively. For any given subcarrier spacing, a signal or data is sent as a series of frames, each of which is subdivided into sub-frames. As shown, for $\mu$=0, 1, 2, 3, and 4 in the 5G numerology, the number of sub-frames per each frame is 10. Each sub-frame is further divided into slots, and as shown, for 0, 1, 2, 3, and 4, the number of corresponding slots per sub-frame is $2^\mu$=1, 2, 4, 8, and 16. Each slot carries 14 Orthogonal Frequency Division Multiplex (OFDM) symbols. In a different implementation, the number of symbols per slot may be different, depending on the OFDM cyclic prefix type.

Figure 3D:
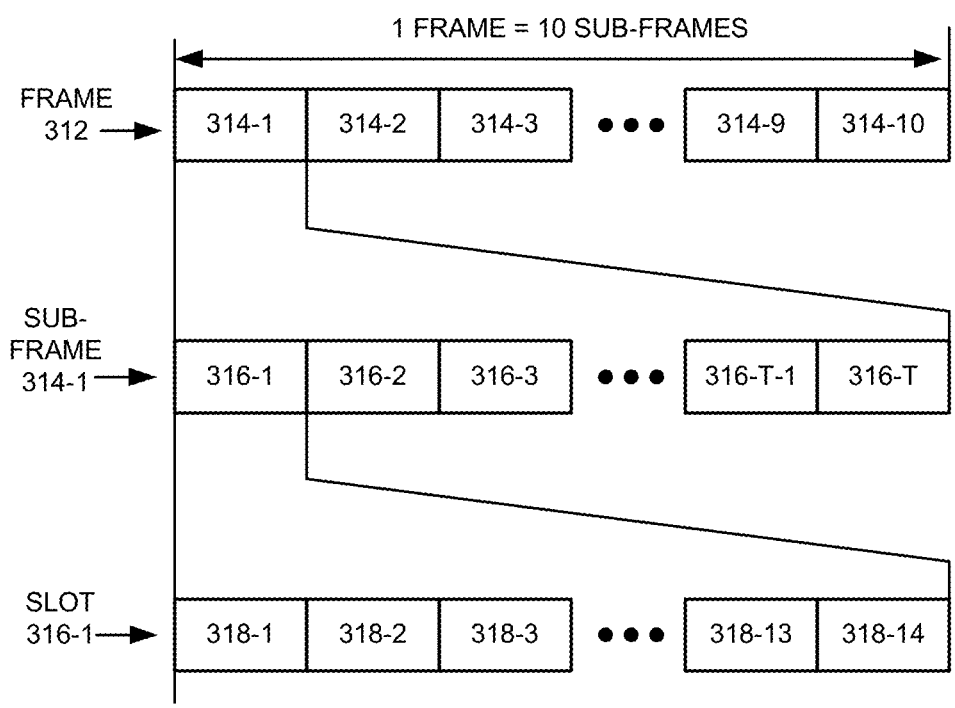
FIG. 3D shows exemplary radio frames that are associated with the 5G numerology of FIG. 3C.

FIG. 3D depicts exemplary radio frames that are associated with the 5G numerology. As shown, one frame 312 is divided into 10 sub-frames 314-1 through 314-10. Each sub-frame (e.g., sub-frame 314-1) is further divided into slots 316-1 through 316-T, where T is determined by the 5G numerology. Each slot (316-1) carries symbols 318-1 through 318-14, assuming the normal OFDM cyclic prefix.

FIG. 4 shows exemplary signals between UE device 102, base station 104, and another network component within provider network 108, which is depicted as an Access and Mobility Function (AMF) 402. UE device 102 may manage its TDD uplink duty cycle during exchange of signals of FIG. 4 between UE device 102 and base station 104. The signals may include structures that are depicted in FIG. 3D, in accordance with the 5G numerology of FIG. 3C.

In FIG. 4, base station 104 may send at least three different types of signals that indicate a particular pattern of uplink and downlink symbol sequences, which may occur within radio frame slots 316 described above with reference to FIG. 3D. Described below are: each of these three types of signals from base station 104; the patterns of symbol sequences specified by each type of signal; and UE device 102's procedures for managing TDD uplink duty cycle in response to receiving the signal that specifies the pattern.

A first type of signal in which base station 104 may specify a pattern of uplink and downlink symbol sequences includes a downlink broadcast or common signal 410. UE devices 102 that are in the cell that base station 104 serves may receive signal 410. Signal 410 may carry information ($I_C$) needed by UE devices 102 to establish communications with provider network 108. The information $I_C$ is carried in radio frames 312 in specific frequency ranges and relative time windows, as described below with reference to an exemplary resource grid 500 (FIG. 5).

$I_C$ in radio frames 312 may include, for example, synchronization information, a cell identifier, Radio Network Temporary Identifiers, etc. In particular, the information may include a Slot Format Indicator (SFI). When UE device 102 receives signal 410, UE device 102 extracts $I_C$ and an SFI, which UE device 102 may use to determine the network-permitted TDD uplink duty cycle $D_N$. UE device 102 may use $D_N$, the internal maximum allowable uplink duty cycle ($D_{MAX}$) of UE device 102 itself, and/or its maximum time-average transmission power ($P_{MAX}$) to determine an appropriate duty cycle $D_C$ and/or a power level $P_A$ at which UE device 102 is to transmit data, so as to avoid spending more power than that permitted by its power ratings and to avoid being non-compliant with emission and RF exposure regulations.

Figure 5:
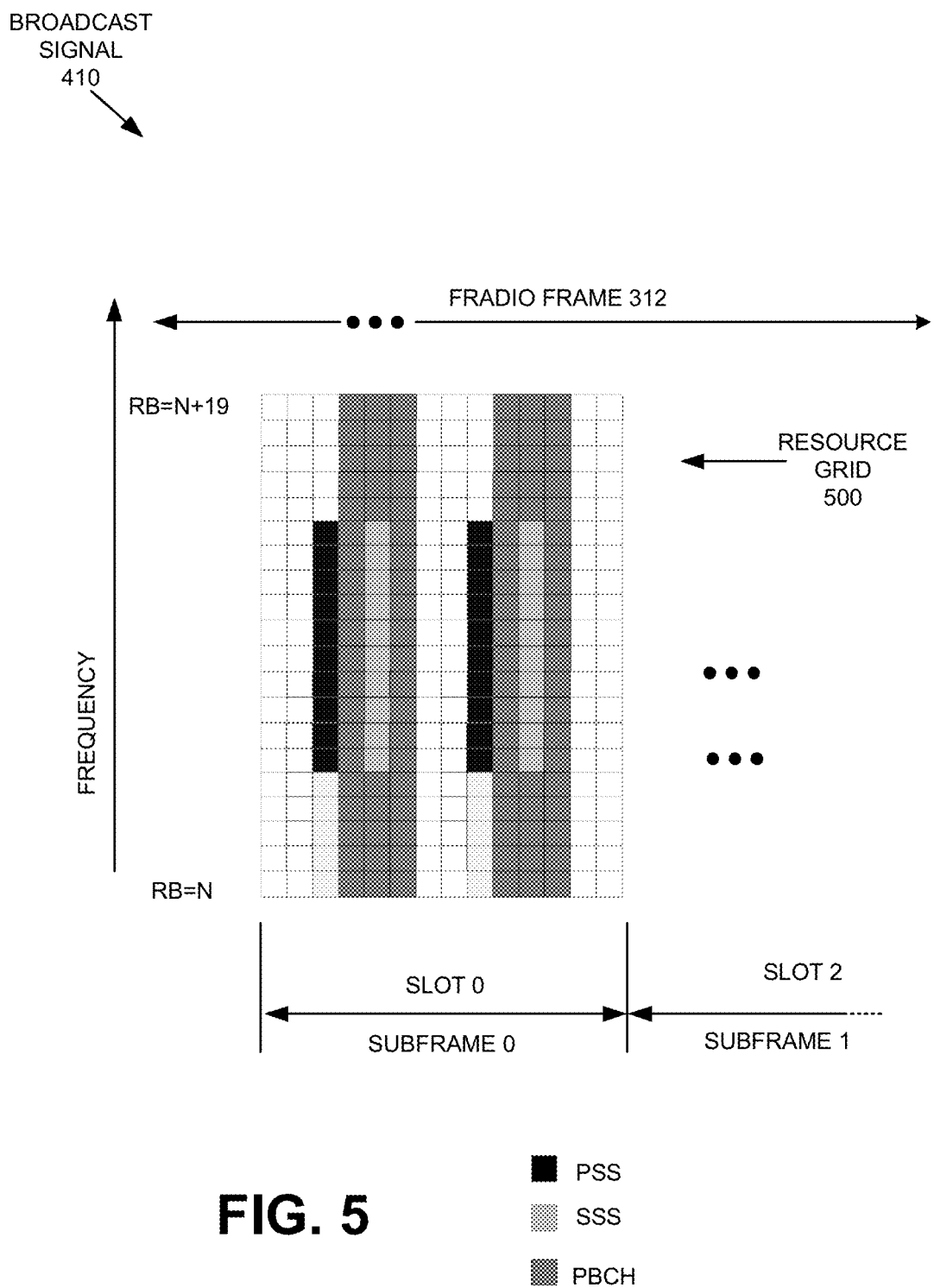
FIG. 5 illustrates an exemplary structure of the TDD broadcast signal, of FIG. 4, in which a Slot Format Indicator (SFI) maybe found, according to an exemplary implementation.

FIG. 5 illustrates an exemplary structure of TDD broadcast/common signal 410, in which an SFI maybe found. UE device 102 may extract the SFI from broadcast/common signal 410 and use the SFI to derive the network-permitted TDD uplink duty cycle $D_N$. As shown, signal 410 includes one or more of radio frame 312, which in turn includes sub-frames 0-10. Only sub-frame 0 is shown in its entirety. In FIG. 5, each sub-frame includes a single slot, which indicates that the structure illustrated in FIG. 5 is associated with the number 0 of the 5G numerology, in accordance with FIGS. 3C and 3D.

In FIG. 5, each square represents a resource block, which is a unit of frequency range and time interval that base station 104 may allocate (e.g., schedule) for transmission or reception by UE device 102. Each resource block may span a number of subcarriers (e.g., 12) in frequency and one OFDM symbol duration in time. The spacing of the subcarriers and the symbol duration may depend on the specific Radio Access Technology (RAT) and its mode of operation. In FIG. 5, the spacing between the carriers may be 15 kHz and the symbol duration may be 66.67 microseconds. In other implementations, other symbol durations, different carrier frequencies, slots per sub-frames, etc. may be used in accordance with the 5G numerology.

In FIG. 5, resource blocks are illustrated as extending from RB=N to RB=N+19 in frequency and ½ frame (i.e., 5 sub-frames) in time. Each sub-frame and slot include 14 symbols, assuming the standard OFDM cyclic prefix (CP).

FIG. 5 also shows different signals and channels that are present within 5 sub-frames. The signals/channels include: a Primary Synchronization Signal (PSS), a Secondary Synchronization Signal (SSS), a Physical Broadcast Channel (PBCH), a Physical Downlink Control Channel (PDCCH), a Physical Downlink Shared Channel (PDSCH), etc. For simplicity, only the PSS, the SSS, and the PBCH are illustrated in FIG. 5. The signals/channels include decoding and timing information necessary for UE device 102 to extract additional information, such as the SFI, from the downlink signals from base station 104.

The PSS, SSS, and PBCH form a block which may recur within frames with a predetermined periodicity. The PSS and SSS are signals to which UE devices 102 in the cell may synchronize. The PBCH includes information for decoding Physical Downlink Control Channel (PDCCH) and Physical Downlink Shared Channel (PDSCH), which schedule other system information (e.g., Remaining Minimum System Information (RMSI), Other System Information (OSI), etc.).

The PDCCH carries a Downlink Control Information (DCI), which comes in one of multiple formats. One format of DCI relates to a Slot Format Indicator (SFI) for TDD links. An SFI designates combinations of groups of indices, called Slot Formats (SFs). Each SF includes an index into the SF table, described below with reference to FIG. 6A.

Figures 6A, 6B:
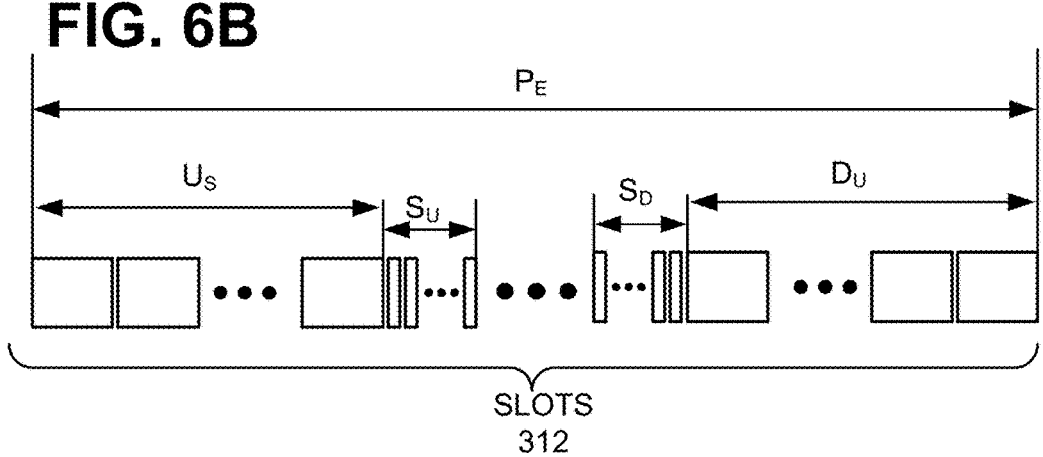
FIG. 6A illustrates exemplary TDD Slot Format (SF) table for the slots of FIG. 3D.
FIG. 6B illustrates an exemplary slot format.

FIG. 6A illustrates an exemplary SF table 602. As mentioned previously, a slot may carry a particular number of OFDM symbols. Given a 5G TDD channel, each symbol in a slot may be a downlink symbol (i.e., a symbol transmitted from base station 104 to UE device 102) or an uplink symbol (i.e., a symbol transmitted from UE device 102 to base station 104).

When UE device 102 and base station 104 send uplink and downlink symbols in a slot, UE device 102 and base station 104 may take turns transmitting data/symbols in accordance with one of multiple, predefined timing patterns (also herein referred to as "symbol patterns"). Each of these timing patterns is a slot format that occupies a particular row in SF table 602. For example, assume that UE device 102 receives broadcast/common signal 410 and demodulates the PBCH and PDCCH DCI to obtain an SFI that includes an SF with the value 45. The 45 designates the 45th row of SF table 602. The 45th row shows 12 downlink and uplink symbols, having the pattern "D D D D D D F F U U U U U U." Using this pattern, UE device 102 and base station 104 may schedule their symbol transmissions. For the first 6 symbols (denoted by "D" for downlink symbols), base station 104 may transmit its symbols; for the next 2 symbols (denoted by 'F" for flexible symbols), either UE device 102 or base station 104 may transmit; and for the last 6 symbols, UE device 102 may transmit its symbols. UE device 102 and base station 104 would adhere to the timing pattern (i.e., Slot Format) specified by each of the combinations of groups of SFs listed in the SFI.

In some implementations, an SF may take an integer value in the range 0-61, each of which corresponds to a slot format in SF table 602. The SF value of 255 indicates a special slot format which is not listed in SF table 602.

FIG. 6B illustrates the special slot format specified by the SF value of 255. As shown, slots 312 are characterized by several parameters: a periodicity ($P_E$); an Uplink Slot count ($U_S$); an Uplink Symbol count ($S_U$); a Downlink Symbol count ($S_U$); and a Downlink Slot count ($D_S$). If UE device 102 detects, within the SFI, the SF value of 255, UE device 102 may further extract, via PDCCH and PDSCH, each of these parameters $P_E$, $U_S$, $S_U$, $S_D$, and $D_S$.

When UE device 102 reads the list of SFs within each combinations of SFs within the SFI, UE device 102 may calculate the network permitted TDD uplink duty cycle $D_N$ by averaging the duty cycles for SFs for each SF combinations in the SFI. That is:

$$D_N = \text{Average of the duty cycles for slot formats, for each SF combinations, associated with the SFI.} \quad (1)$$

For example, if an SFI includes a single SF combination (SFC), and the SFC has three SFs, $D_N$ would be equal to the average of the duty cycles corresponding to the three SFs. The uplink duty cycle for a Slot Format can then be determined by examining the number of uplink symbols, flexible symbols, and downlink symbols. If the SFI has a single SFC and the SFC has only one SF, then $D_N$ would be equal to the uplink duty cycle for this single slot format.

Figure 7A:
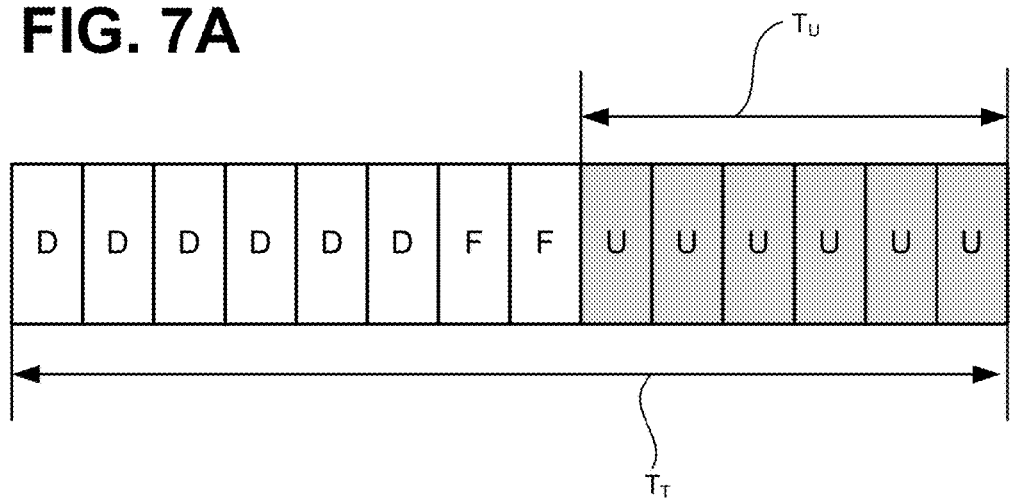
FIG. 7A illustrates an exemplary duty cycle associated with a slot format of FIG. 6A.

FIG. 7A illustrates an exemplary duty cycle associated with a slot format of FIG. 6A. In FIG. 7A, a slot spans $T_T$ symbols. Of $T_T$ symbols, $T_U$ symbols are TDD uplink symbols. Accordingly, $D_N$ is equal to $T_U/T_T$, assuming that the flexible symbols are not counted in the calculation. In some implementations, the flexible symbols maybe counted as uplink symbols, and $D_N$ is equal to $(T_U+\text{number of flexible symbols})/T_T$. If one or more of the SFs in the SFCs of the SFI has the value of 255, the duty cycles associated with each SF of 255 would be appropriately weighted and averaged with other duty cycles associated with other SFs, based on each slot pattern corresponding to the SF value of 255 and characterized by $P_E$, $U_S$, $S_U$, $S_D$, and $D_S$, as discussed above with respect to FIG. 6B.

Figure 7B:
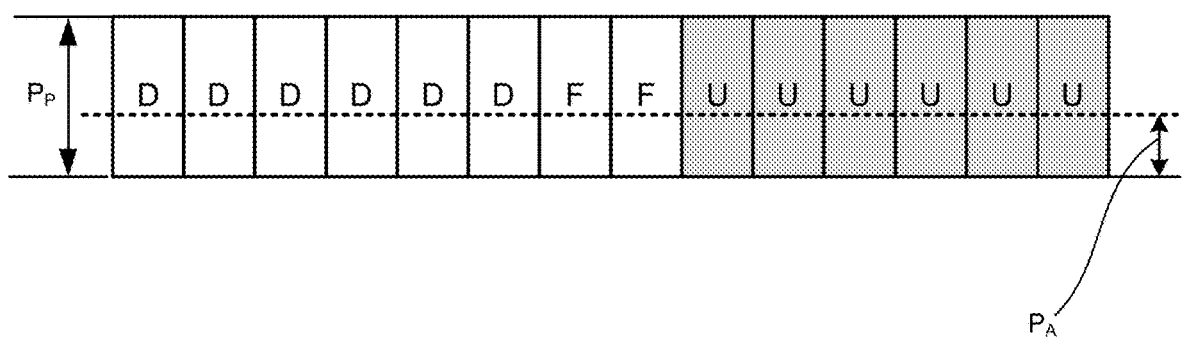
FIG. 7B shows an exemplary TDD time-average uplink transmission power for the slot format of FIG. 7A.

In managing its TDD uplink duty cycle, UE device 102 may determine its projected time average transmission power associated with the network-permitted the duty cycle $D_N$. The time average transmission power is given by: $P_A = P_P \times D_N$, where $P_P$ is the peak symbol power. FIG. 7B shows the time-average transmission power $P_A$ for the duty cycle of FIG. 7A, having peak symbol power of $P_P$.

Assuming UE device 102 has determined $D_N$ and $P_A$ using broadcast/common signal 410 from base station 104, UE device 102 may manage its duty cycle $D_C$ based on its maximum allowable uplink duty cycle $D_{MAX}$ and/or the maximum allowable time-average transmission power $P_{MAX}$. More precisely, when UE device 102 determines that $D_N$ is greater than $D_{MAX}$, UE device 102 may manage its TDD uplink duty cycle during its uplink transmission times (e.g., indicated by a scheduling grant in the PDCCH during Radio Resource Control (RRC) connection) by: (1) reprioritizing and throttling uplink data such that its actual uplink duty cycle $D_C$ does not exceed $D_{MAX}$; and/or (2) reducing its transmission power such that the time average transmission power $P_A$ does not exceed $P_{MAX}$. These TDD uplink duty cycle management procedures are described below for the SFI having a single SFC that has a single SF, with reference to FIGS. 8A-8D. If an SFI includes multiple SFCs that have multiple SFs, UE device 102 applies the procedure described below with respect to FIGS. 8A-8D for each slot formats corresponding to the SFCs and SFs.

Figure 8A:
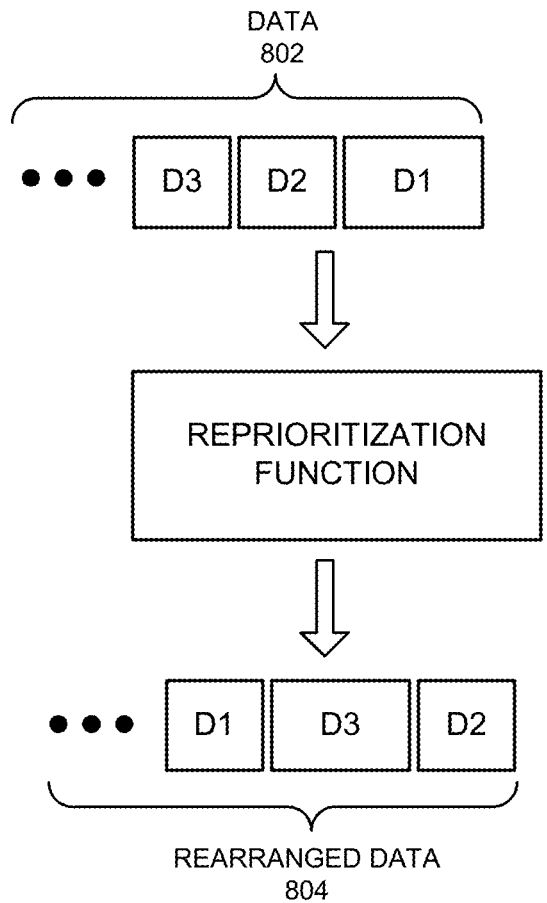
FIG. 8A illustrates exemplary reprioritization of symbols to be transmitted by the UE device of FIG. 1.
Figure 8B:
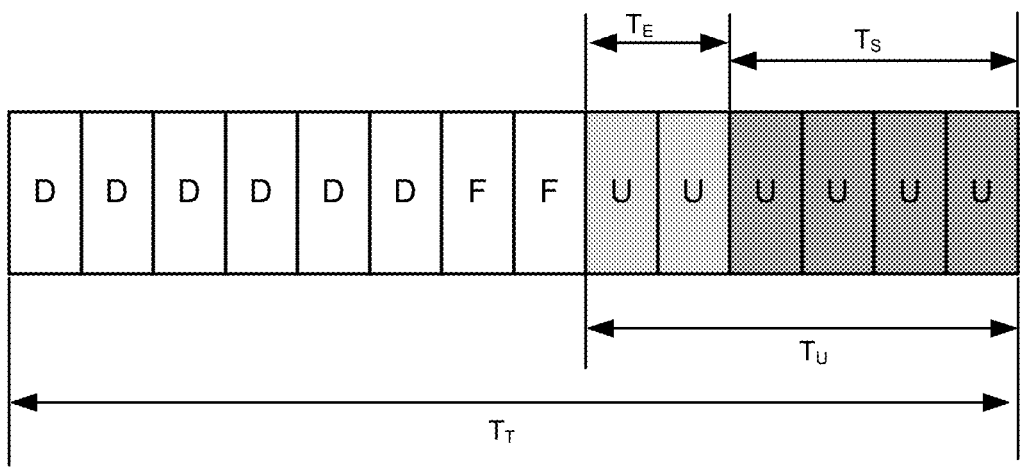
FIG. 8B illustrates exemplary throttling of uplink symbols by the UE device of FIG. 1.

FIGS. 8A and 8B illustrate exemplary reprioritizing and throttling of TDD uplink symbols during scheduled uplink transmission times such that the actual TDD uplink duty cycle $D_C$ of UE device 102 does not exceed its maximum TDD uplink duty cycle $D_{MAX}$. In the example of FIGS. 8A and 8B, the SFI includes only a single SFC, with a single slot format. According to some embodiments, the reprioritizing and throttling maybe performed by modem 212.

In FIG. 8A, assume that data 802 arrive as three groups D1, D2, and D3 at a Reprioritization Function within modem 212 of UE device 102, from another component within UE device 102. D1, D2, and D3 are to be transmitted at modem 212. Further, assume that D1, D2, and D3 are associated with different QCI priorities (Quality-of-Service (QoS) Class Identifier priorities) Q1, Q2, and Q3, where Q2>Q3>Q1. As shown, the Reprioritization Function receives the incoming data 802 (D1, D2, and D3 in order) and reorders them in accordance with the QCI priorities Q2, Q3, and Q1, to obtain rearranged data 804. After the reprioritization and the reordering, the symbols of D2 would be transmitted first, D3 second, and D1 third.

FIG. 8B illustrates exemplary throttling of TDD uplink data by modem 212. The throttling ensures that the actual TDD uplink duty cycle $D_C$ of UE device 102 does not exceed its maximum TDD uplink duty cycle $D_{MAX}$. Assume that after UE device 102 obtained an SFI from broadcast/common signal 410, UE device 102 has used the SFI to obtain a slot format from SF table 602. Assume further that the slot format is as shown in FIG. 8B. The network-permitted duty cycle $D_N$ is $T_U/T_T = 6/14$. Assume that $D_{MAX}$ is $5/14$.

To throttle data, modem 212 may delay the transmission of segments of the rearranged data 804 such that UE device 102 indicates to base station 104 that it has less data to send, and, in response, base station 104 does not schedule UE device 102 to transmit on more than 5 uplink slots. For example, modem 212 may buffer the rearranged data 804 with lower QCI priorities and only send the rearranged data 804 with higher QCI priorities to the lower layers of modem 212 for transmission. Alternatively, modem 212 may throttle by limiting its transmissions at symbol positions, within the slot pattern, where the network expects uplink symbols (i.e., symbols marked "U"). That is, UE device 102 may ignore some uplink slots included in the uplink scheduling grant from base station 104.

For example, assume that UE device 102 has been scheduled by base station 104 to transmit on all uplink symbol positions of the SF. Although there are total of 6 U symbol positions at which modem 212 of UE device 102 can transmit, actually transmitting at all of those possible locations would result in $D_C$ of $6/14$, which exceeds $D_{MAX}$ of $5/14$. Accordingly, UE device 102 selects four symbol positions at which it is to transmit as much of its rearranged data that can be transmitted within those four symbol positions. In FIG. 8B, these symbol locations are shaded in dark gray, spanning $T_S$ symbols. Modem 212 would leave $T_E$ within $T_S$ positions empty (i.e., modem 212 would not transmit any symbols at $T_E$ lightly shaded positions). $D_C$ is given by $T_S/T_T = 4/14$, which is below $D_{MAX}$ of $5/14$.

In the example of FIG. 8B, the flexible symbol positions (i.e., the positions marked "F") are not counted as uplink symbols. In some implementations, the flexible symbol positions may be counted as uplink symbols in determining $D_N$ and $D_C$. Furthermore, the symbol positions at which UE device 102 is to transmit do not need to be contiguous, although FIG. 8B shows the symbol positions as being such.

Figure 8C:
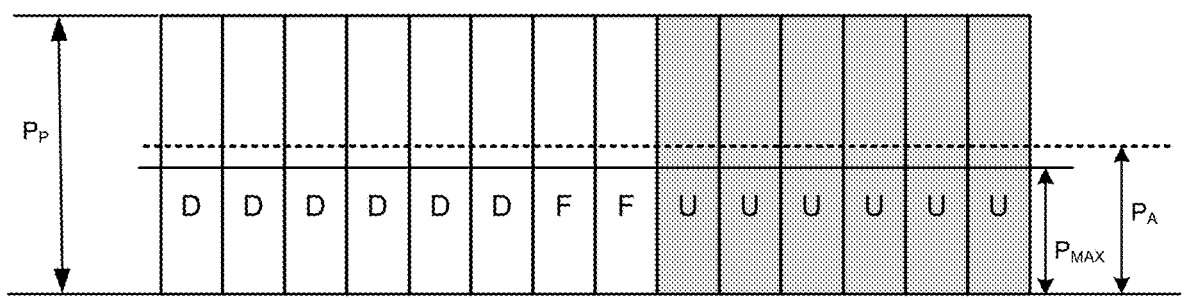
FIGS. 8C and 8D illustrate exemplary limiting of the TDD time-average uplink transmission power by the UE device of FIG. 1.
Figure 8D:
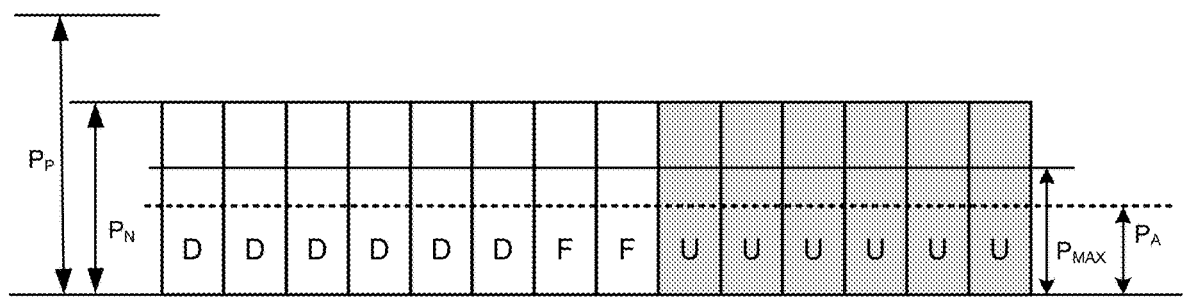

FIGS. 8C and 8D illustrate exemplary limiting of the time-average transmission power $P_A$ by UE device 102. In FIG. 8C, symbols are transmitted by modem 212, with the peak symbol power of $P_P$. Assume that UE device 102 transmits data in all of the uplink symbol positions within the slot format shown. Then the time average transmission power $P_A$ is given by: $P_P \times D_N$. As shown, $P_A$ is greater than the maximum allowable time-average transmission power $P_{MAX}$ of UE device 102.

FIG. 8D shows a result of UE device 102 decreasing its peak symbol transmission power, from $P_P$ to $P_N$. As shown, when UE device 102 lowers its peak symbol transmission power from $P_P$ to $P_N$, the average transmission power falls to a new $P_A$, such that $P_A < P_{MAX}$.

So far, a first type of signal (i.e., broadband/common signal 410) in which base station 104 specifies a pattern of uplink and downlink symbols sequence has been described, as well as UE device 102's management of its TDD uplink duty cycle $D_C$ in response to signal 410. Returning to FIG. 4, a second type of downlink signal in which base station 104 may specify a pattern of uplink and downlink symbols sequences includes a scheduling grant signal. More specifically, after base station 104 and UE device 102 perform Random Access Channel (RACH) Procedure 412 to establish a Radio Resource Control (RRC) connection, base station 104 may send a scheduling grant (not shown in FIG. 4) to UE device 102 in response to an uplink scheduling request (not shown in FIG. 4) from UE device 102.

When base station 104 sends a scheduling grant to UE device 102, base station 104 provides, in the DCI within a PDCCH of the grant signal, a schedule for a Physical Uplink Shared Channel PUSCH). The grant signal may include a row index pointing to a PUSCH-allocation list, which indicates one or more sets of timing parameters. Each set of timing parameters may indicate a start time and a consecutive number of symbols that may be transmitted in the uplink by UE device 102.

To illustrate how UE device 102 may determine $D_N$, assume that there is only one set of timing parameters specified by a grant signal, and that the set specifies $T_U$ consecutive symbols. The duty cycle $D_N$ is then given by:

$$D_N = \text{Average of } T_U/(\text{Total number of symbols } T_T) \text{ over a selected transmission interval} \quad (2)$$

After determining $D_N$ based on the scheduling grant in accordance with expression (2), UE device 102 may perform a procedure involving $D_{MAX}$ and $P_{MAX}$, similar to the procedure described above with reference to broadcast/common signal 410. UE device 102 performs a throttling procedure to transmit uplink data only at selected symbol locations within the time span specified by the timing parameters. As in the case with the throttling procedure described above, UE device 102 selects $T_S$ symbols (with $T_E$ empty spots within $T_U$ symbols). UE device 102 may determine $T_T$ based on the entire time interval over which an average transmission power should be considered for determining $P_A$, and not only over the time interval which the PUSCH signal is to occupy.

Still referring to FIG. 4, a third type of downlink signal in which base station 104 may specify a pattern of uplink and downlink symbols sequences includes an RRC signal, which may be sent by base station 104 after RACH procedure 412, for establishing an RRC connection or providing RRC parameter values to UE device 102.

Figure 9A:
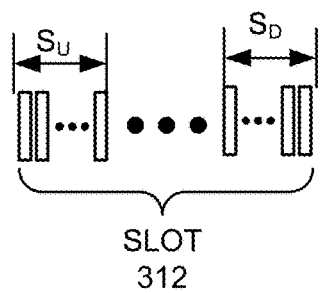
FIG. 9A illustrates an exemplary device-specific slot pattern.

The RRC-signaled pattern of symbol sequences may indicate two symbol patterns: a device-specific pattern (e.g., a symbol pattern for a particular UE device 102) and a common pattern (e.g., a symbol pattern for a group of UE devices 102). FIG. 9A illustrates an exemplary device-specific pattern, and FIG. 6B illustrates the exemplary common pattern.

For the device-specific pattern, base station 104 may designate a series of patterns for slots of a radio frame. For each designated slot, base station 104 may specify a number of uplink symbols $S_U$ and a number of downlink symbols $S_D$. For the common pattern, base station 104 may specify the parameters already discussed above with reference to FIG. 6B.

Figure 9B:
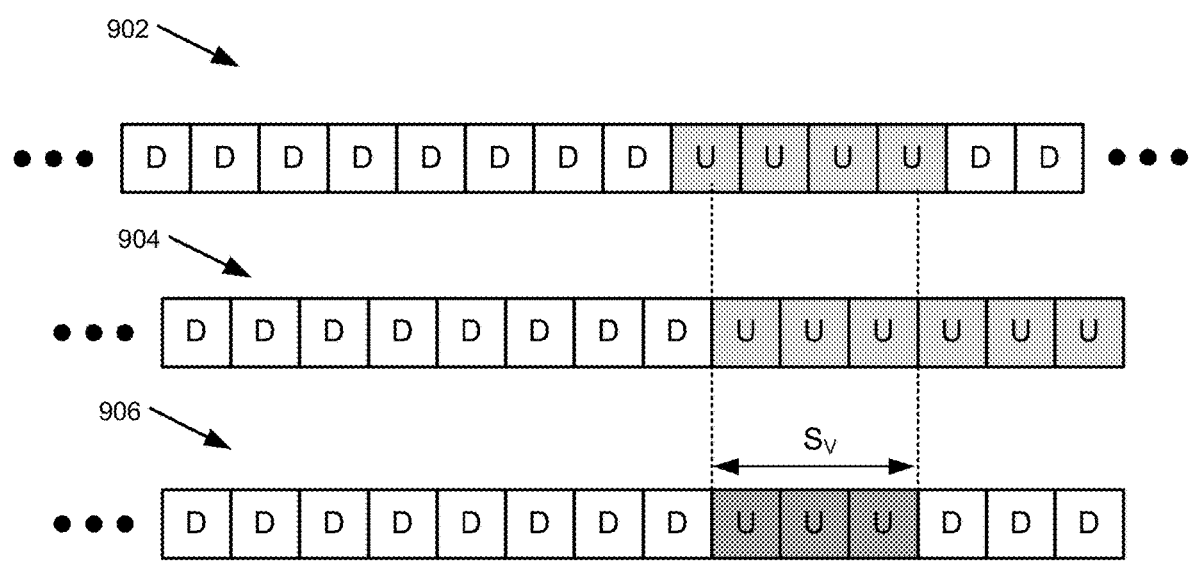
FIG. 9B illustrates an exemplary uplink transmission symbol pattern that is consistent with a device-specific symbol pattern and a common symbol pattern.

When base station 104 indicates a device-specific symbol pattern and a common symbol pattern in an RRC signal, UE device 102 needs to transmit in accordance with a symbol pattern that is consistent with the device-specific symbol pattern and the common symbol pattern. FIG. 9B illustrates an exemplary symbol pattern 906 that is consistent with an exemplary device-specific symbol pattern 902 and a common symbol pattern 904. Using pattern 906, UE device 102 may throttle data similarly as in the procedure described above in connection with broadcast/common signal 410, to obtain $D_C$ and $P_A$ that conform to its duty cycle and power requirements. Because only downlink symbol positions $S_V$ also occupy downlink positions in patterns 902 and 904, UE device 102 may transmit data only in downlink symbol positions $S_V$.

Returning to FIG. 4, in addition to controlling its own transmissions to manage TDD uplink duty cycle, UE device 102 may send its capability information to access network 106 and provider network 108. The capability information may indicate the maximum TDD duty cycle and a transmission power level for UE device 102. In some implementations, base station 104, access network 106, and provider network 108 may include logic to determine and issue an appropriate new symbol pattern to UE devices 102 in the cell serviced by base station 104, such that $D_N$ would be less than $D_{MAX}$ or $P_A$ would be lower than $P_{MAX}$. In other implementations, base station 104, access network 106 and provider network 108 may not support the mechanism for issuing a new symbol pattern based on the capability information.

UE device 102 may send its capability information to base station 104 in different situations. As illustrated in FIG. 4, base station 104 may request UE device 102 to send its capability information in relation to: (1) a network attach or registration procedure 412; (2) a Handover procedure 414; or (3) an Update or re-registration procedure 416. UE device 102 and base station 104 may perform: the network attach or registration procedure 412 when UE device 102 and base station 104 establish a new network session between UE device 102 and provider network 108; the Handover procedure 414 when UE device 102 moves from one cell to another cell serviced by a different base station 104; and the Update or re-registration procedure 416 when UE device 102 needs to indicate that its capability information should be updated at provider network 108.

As shown, in or at the end of each of procedures 412, 414, and 416, base station 104 may send a UE capability information request to UE device (420), to which UE device 102 may respond with a confirmation 422 that describes capabilities of UE device 102. Base station 104 may then determine whether the capability information includes UE device duty cycle- or power-related information. Based on such information, base station 104 may determine a new symbol pattern for UE device 102 and may convey the information to the UE device 102. In addition, base station 104 may forward the received UE capability information to AMF 402 (424) for storage and future use. AMF 402 partly manages UE device 102 access to provider network 108 and its mobility-related issues.

FIG. 10 is a flow diagram of an exemplary UE duty cycle management process 1000 associated with modem 212. As shown, process 1000 may include UE device 102 receiving a signal that specifies TDD uplink symbol pattern from base station 104 (block 1002). For example, UE device 102 may receive a broadcast/common signal 410. When UE device 102 receives broadcast/common signal 410, UE device 102 synchronizes to the PSS and the SSS within the broadcast signal.

After the synchronization, UE device 102 may identify Physical Broadcast channel (PBCH) whose demodulation allows UE device 102 to locate and lock onto a Physical Downlink Control Channel (PDCCH). The PDCCH includes Downlink Control Information (DCI), which UE device 102 extracts from the PDCCH to obtain the SFI. More generally, UE device 102 may obtain the symbol pattern based on the received signal from base station 104 (1004). For example, when UE device 102 receives broadcast/common signal 410, UE device 102 may obtain a slot pattern associated with the corresponding SFI. UE device 102 may obtain the slot pattern using an SF table.

Process 1000 further includes UE device 102 determining $D_N$ based on the symbol pattern (block 1006). For example, given a symbol pattern, UE device 102 may calculate the ratio of the number of uplink symbols to the total number of symbols within a given pattern to determine $D_N$. If there are multiple patterns, UE device 102 may obtain $D_N$ by averaging such ratios over the patterns for the transmission interval. In addition, UE device 102 may determine $P_A$ (block 1006). For example, UE device 102 may determine $P_A$ by multiplying the peak symbol transmission power $P_P$ by the duty cycle $D_N$.

UE device 102 may compare the $D_N$ to its internal maximum allowable duty cycle $D_{MAX}$ (block 1008). In some implementations, $D_{MAX}$ may have been predetermined based on emission limits and/or RF exposure regulations. If $D_N$ is less than or equal to $D_{MAX}$ (block 1008: YES), UE device 102 may use the symbol patterns designated by the received signal during scheduled transmission times (e.g., scheduled transmission times set during an RRC connection), in effect setting the uplink duty cycle $D_C$ of UE device 102 to $D_N$ (block 1010).

At block 1008, if $D_N$ is greater than $D_{MAX}$ (block 1008: NO), UE device 102 may manage its duty cycle $D_C$ during the scheduled transmission times by reprioritizing its transmission data and throttling the reprioritized data (e.g., reordered data) (block 1012) by delaying transmission of some segments of the reprioritized data. UE device 102 may perform the reprioritization based on QoS class associated with the data (e.g., using QCI priority) and delay the transmission of data with lower QCI priority. Also, UE device 102 may throttle data by transmitting symbols only at selected uplink locations within the slot patterns, so that the duty cycle $D_C$ for the transmitted symbols is less than $D_{MAX}$. That is, UE device 102 may ignore some uplink slots included in the uplink scheduling grant from base station 104.

If throttling the data is not possible (e.g., due to a need to transmit data to provider network 108 at a high rate) or if throttling the data is insufficient to reduce $D_C$ below $D_{MAX}$, UE device 102 may attempt to reduce its peak symbol power $P_P$, such that its average uplink transmission power $P_A$ is less than $P_{MAX}$ of UE device 102 (block 1012).

In some implementations, if UE device 102 is unable to either control its duty cycle $D_C$ or $P_A$ such that $D_C<D_{MAX}$ or $P_A<P_{MAX}$, UE device 102 may ignore the entire uplink scheduling grant from base station 104.

In addition to or alternative to controlling symbol transmissions to manage its duty cycle $D_C$, UE device 102 may send UE capability information to base station 104 and provider network 108 (block 1014). The capability information may allow base station 104 and/or network 108 to determine $D_{MAX}$ and $P_A$ of UE device 102 and/or one or more combinations of a duty cycle value and average power at which UE can transmit uplink data. Depending on the implementation, base station 104 may issue a new $D_N$ (i.e., conveyed through a new SFC) to UE device 102, such that $D_N$ is less than $D_{MAX}$ and/or $P_A<P_{MAX}$. Base station 104 may also set a $D_N$ that is greater than $D_{MAX}$ but control the number of uplink slots included in the uplink scheduling grant to UE device 102 such that $D_C$ is less than $D_{MAX}$ and/or $P_A<P_{MAX}$.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 10, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
   a memory to store instructions and information indicating a duty cycle threshold of the device or a power limit of the device; and
   a processor to execute the instructions to:
   receive a signal from a wireless station, wherein the signal indicates permitted Time Division Duplex (TDD) uplink symbol positions and other TDD symbol positions in a specified period;
   determine a network-permitted TDD uplink duty cycle based on the received signal, wherein the network-permitted TDD uplink duty cycle is equal to a ratio of a number of the permitted TDD uplink symbol positions to a total number of symbol positions in the specified period;
   determine whether the network-permitted TDD uplink duty cycle is greater than a maximum allowable TDD uplink duty cycle determined based on the stored information; and
   when the network-permitted TDD uplink duty cycle is determined to be greater than the maximum allowable TDD uplink duty cycle, when the device performs TDD uplink transmission after receiving an uplink scheduling grant from the wireless station, decrease a TDD uplink duty cycle of the device or decrease a time-average transmission power of the device.

2. The device of claim 1, wherein when the processor decreases the time-average transmission power of the device, the processor is to:
ignore the uplink scheduling grant and not transmit in accordance with a schedule specified by the uplink scheduling grant.

3. The device of claim 1, wherein when the processor decreases the TDD uplink duty cycle of the device, the processor is to:
reprioritize an order of transmission of uplink data; and throttle transmission of the uplink data.

4. The device f claim 1, wherein when the processor decreases the time-average transmission power of the device, the processor is to:
decrease a peak uplink symbol transmission power.

5. The device of claim 1, wherein the received signal includes one of: a signal common to a group of user equipment devices; a scheduling grant; or a Radio Resource Control (RRC) signal.

6. The device of claim 5, wherein when the processor determines the network-permitted TDD uplink duty cycle, the processor is further to:
determine a pattern of uplink and downlink symbols based on the received signal.

7. The device of claim 1, wherein the processor is further to:
send capability information pertaining to the device to the wireless station.

8. The device of claim 7, wherein the capability information indicates:
the maximum allowable TDD uplink duty cycle for the device;
a maximum allowable time-average TDD uplink transmission power of the device; or
a combination of allowable TDD uplink duty cycles and corresponding allowable TDD uplink transmission powers of the device.

9. The device of claim 7, wherein the wireless station is to:
receive the capability information;
determine a new slot format or uplink scheduling grant according to which the device can transmit TDD uplink symbols without exceeding the maximum allowable TDD uplink duty cycle or the maximum allowable time-average TDD uplink transmission power of the device; and
send information pertaining to the new slot format or uplink scheduling grant to the device.

10. The device of claim 9, wherein before the wireless station receives the capability information, the processor is to:
perform a network attach or registration procedure;
perform an update or re-registration procedure; or
participate in a handoff from the wireless station to another wireless station.

11. A method comprising:
receiving, at a device that includes information indicating a duty cycle threshold of the device or a power limit of the device, a signal from a wireless station, wherein the signal indicates permitted Time Division Duplex (TDD) uplink symbol positions and other TDD symbol positions in a specified period;
determining a network-permitted TDD uplink duty cycle based on the signal, wherein the network-permitted TDD uplink duty cycle is equal to a ratio of a number of the permitted TDD uplink symbol positions to a total number of symbol positions in the specified period;
determining whether the network-permitted TDD uplink duty cycle is greater than a maximum allowable TDD uplink duty cycle determined based on the stored information; and
when the network-permitted TDD uplink duty cycle is determined to be greater than the maximum allowable TDD uplink duty cycle, when the device performs TDD uplink transmission after receiving an uplink scheduling grant from the wireless station, decreasing a TDD uplink duty cycle of the device or decreasing a time-average transmission power of the device.

12. The method of claim 11, wherein decreasing the time-average transmission power of the device includes:
ignoring the uplink scheduling grant and not transmitting in accordance with a schedule specified by the uplink scheduling grant.

13. The method of claim 11, wherein decreasing the TDD uplink duty cycle of the device includes:
reprioritizing an order of transmission of uplink data; and throttling transmission of the uplink data.

14. The method of claim 13, wherein reprioritizing the order of transmission includes:
rearranging the order of transmission of the uplink data based on Quality-of-Service (QoS) Class Identifier priorities associated with the uplink data.

15. The method of claim 11, wherein decreasing the time-average transmission power of the device includes:
decreasing a peak uplink symbol transmission power.

16. The method of claim 11, wherein the received signal includes one of: a signal common to a group of user equipment devices; a scheduling grant; or a Radio Resource Control (RRC) signal.

17. The method of claim 16, wherein determining the network-permitted TDD uplink duty cycle includes:
determining a pattern of uplink and downlink symbols based on the received signal.

18. The method of 11, further comprising:
sending capability information pertaining to the device to the wireless station.

19. A non-transitory computer-readable medium, comprising computer-executable instructions, when executed by a processor in a device including information indicating a duty cycle threshold of the device or a power limit of the device, which cause the processor to:
receive a signal from a wireless station, wherein the signal indicates permitted Time Division Duplex (TDD) uplink symbol positions and other TDD symbol positions in a specified period;
determine a network-permitted TDD uplink duty cycle based on the signal, wherein the network-permitted TDD uplink duty cycle is equal to a ratio of a number of the permitted TDD uplink symbol positions to a total number of symbol positions in the specified period;
determine whether the network-permitted TDD uplink duty cycle is greater than a maximum allowable TDD uplink duty cycle determined based on the stored information; and
when the network-permitted TDD uplink duty cycle is determined to be greater than the maximum allowable TDD uplink duty cycle, when the device performs TDD uplink transmission after receiving an uplink scheduling grant from the wireless station, decrease the TDD uplink duty cycle of the device or decrease a time-average transmission power of the device.

20. The non-transitory computer-readable medium of claim 19, wherein when the processor decreases the time-average transmission power of the device, the processor is to:
ignore the uplink scheduling grant and not transmit in accordance with a schedule specified by the uplink scheduling grant.

* * * * *